United States Patent
Leng

(10) Patent No.: US 10,513,886 B2
(45) Date of Patent: Dec. 24, 2019

(54) SPLICED METAL PLATE

(71) Applicant: XIAMEN GRAND-ONE INDUSTRIAL DESIGNS CO., LTD., Xiamen, Fujian (CN)

(72) Inventor: Luhao Leng, Fujian (CN)

(73) Assignee: XIAMEN GRAND-ONE INDUSTRIAL DESIGNS CO., LTD., Xiamen, Fujian (CN)

(*) Notice: Subject to any disclaimer, the term of this patent is extended or adjusted under 35 U.S.C. 154(b) by 0 days.

(21) Appl. No.: 15/301,875

(22) PCT Filed: Apr. 15, 2015

(86) PCT No.: PCT/CN2015/076629
§ 371 (c)(1),
(2) Date: Oct. 4, 2016

(87) PCT Pub. No.: WO2015/158259
PCT Pub. Date: Oct. 22, 2015

(65) Prior Publication Data
US 2017/0138380 A1    May 18, 2017

(30) Foreign Application Priority Data
Apr. 15, 2014  (CN) .......................... 2014 1 0150173

(51) Int. Cl.
E06C 7/08       (2006.01)
E06C 1/387      (2006.01)
(Continued)

(52) U.S. Cl.
CPC .............. E06C 7/08 (2013.01); A47B 13/06 (2013.01); A47B 13/08 (2013.01); A47B 13/083 (2013.01);
(Continued)

(58) Field of Classification Search
CPC ... E06C 7/08; E06C 1/387; E04G 5/08; E04G 1/154; E04G 1/393
(Continued)

(56) References Cited

U.S. PATENT DOCUMENTS 1,292,960 A * 1/1919 Owens ..................... E04D 3/364
                                                    296/29
3,023,834 A * 3/1962 Buchanan ................. E04C 2/08
                                                    182/223
(Continued)

FOREIGN PATENT DOCUMENTS

CN    201024554 Y    2/2008
CN    202787653 U    3/2013
(Continued)

OTHER PUBLICATIONS

Chinese Search Report cited in Chinese Application No. 201410150173.1 dated May 4, 2015, 4 pgs.
(Continued)

Primary Examiner — Marcus Menezes
(74) Attorney, Agent, or Firm — Cooper Legal Group, LLC

(57) ABSTRACT

A splicing metal plate includes at least one pair of an elongated first and second connecting plate, the elongated first connecting plate having a side edge that extends downwardly vertically with an accommodating portion having an opening, the elongated second connecting plate having a side edge that extends downwardly vertically with an embedded portion, and the accommodating portion of the first connecting plate is embedded within the embedded portion of the second connecting plate. A front-end cover connected to a front-end of the first and second connecting plates along a length direction. A rear-end cover connected to a rear-end of the first and second connecting plates along the length direction. A supporting portion for the front-end
(Continued)

and rear-end covers disposed at bottom portions of the first and second connecting plates.

15 Claims, 10 Drawing Sheets

(51) Int. Cl.
| | | |
|---|---|---|
| E04C 2/08 | (2006.01) | |
| E04C 2/40 | (2006.01) | |
| A47B 13/06 | (2006.01) | |
| A47B 13/08 | (2006.01) | |
| F16B 5/00 | (2006.01) | |
| F16B 12/50 | (2006.01) | |
| F16C 11/04 | (2006.01) | |

(52) U.S. Cl.
CPC .............. *A47B 13/088* (2013.01); *E04C 2/08* (2013.01); *E04C 2/40* (2013.01); *E06C 1/387* (2013.01); *F16B 5/008* (2013.01); *F16B 5/0032* (2013.01); *F16B 5/0056* (2013.01); *F16B 5/0084* (2013.01); *F16B 12/50* (2013.01); *F16C 11/04* (2013.01)

(58) Field of Classification Search
USPC .............................. 182/120, 228.1; 52/582.2
See application file for complete search history.

(56) References Cited

U.S. PATENT DOCUMENTS

| | | | | |
|---|---|---|---|---|
| 3,394,524 A | * | 7/1968 | Howarth | ................ B21D 39/02 |
| | | | | 52/529 |
| 3,511,011 A | * | 5/1970 | Straus | ....................... E04D 3/30 |
| | | | | 52/478 |
| 4,223,503 A | * | 9/1980 | Hague | ..................... E04D 3/362 |
| | | | | 52/394 |
| 5,535,567 A | * | 7/1996 | Cahoon | ................... E04D 3/363 |
| | | | | 52/520 |
| 2011/0147123 A1 | * | 6/2011 | Leng | ......................... E06C 1/39 |
| | | | | 182/194 |
| 2013/0273303 A1 | | 10/2013 | Carr et al. | |
| 2014/0318895 A1 | * | 10/2014 | Birk | ......................... E04G 3/22 |
| | | | | 182/222 |

FOREIGN PATENT DOCUMENTS

| | | | | |
|---|---|---|---|---|
| CN | 103284471 A | | 9/2013 | |
| CN | 104005703 A | | 8/2014 | |
| CN | 203867451 U | | 10/2014 | |
| CN | 203867451 U | | 10/2014 | |
| DE | 1778509 A1 | * | 2/1972 | .......... E04F 11/0255 |
| DE | 29904654 U1 | | 7/1999 | |
| FR | 2501267 A1 | * | 9/1982 | ............. E04G 1/152 |
| FR | 2584761 A3 | * | 1/1987 | ............. E04G 1/152 |
| FR | 2866042 A1 | | 8/2005 | |
| GB | 2156889 A | | 10/1985 | |
| WO | WO-02088487 A1 | * | 11/2002 | ............. E04G 1/152 |
| WO | WO-2005040524 A1 | * | 5/2005 | ............... E04C 2/22 |
| WO | 2010/037296 A1 | | 4/2010 | |

OTHER PUBLICATIONS

First Chinese Office Action cited in Chinese Application No. 201410150173.1 dated May 13, 2015, 11 pgs.
Second Chinese Office Action cited in Chinese Application No. 201410150173.1 dated Dec. 2, 2015, 13 pgs.
Third Chinese Office Action cited in Chinese Application No. 201410150173.1 dated Mar. 31, 2016, 8 pgs.
Decision of Rejection cited in Chinese Application No. 201410150173.1 dated Sep. 26, 2016, 5 pgs.

* cited by examiner

SPLICED METAL PLATE

FIELD OF THE INVENTION

The present invention relates to a splicing metal plate.

BACKGROUND OF THE INVENTION

Footsteps of ladder and table tops are usually trimmed from large flat plate according to size needed, on one hand, they have weak bearing capacity, on another hand, leftover materials after trimming are discarded, which wastes resources.

SUMMARY OF THE INVENTION

The present invention provides a splicing metal plate, which overcomes the disadvantages of the existing known technology. The technical proposal of the present invention is that:

A splicing metal plate, comprising at least a pair of elongated first connecting plate and elongated second connecting plate;

the side edge of the first connecting plate is extended downwardly vertically with an accommodating portion with an opening, the side edge of the second connecting plate is extended downwardly vertically with an embedded portion, the embedded portion of the second splicing metal plate is embedded to the accommodating portion of the first splicing plate, the end of the embedded portion is inserted into the accommodating portion from the opening and thus locked to the accommodating portion, further comprising a front end cover and a rear end cover, the front end cover is connected to the front end of the first connecting plate and the second connecting plate along the length direction, the rear end cover is connected to the rear end of the first connecting plate and the second connecting plate along the length direction, the front end cover and the rear end cover are disposed with a support portion at the bottom portion of the first splicing plate and the second splicing plate, the front end cover, the rear end cover, the first connecting plate and the second connecting plate surrounds and defines a groove structure with the bottom portion opening.

In another preferred embodiment, the embedded portion comprises a plug body, a protruding extending vertically upwardly from one side surface of the plug body, a lock arm extending vertically downwardly from another side surface of the plug body; the thickness of the plug body is corresponding to the height of the opening; the accommodating portion is hollow pipe shaped, the opening is disposed on the side surface of the accommodating portion faced to the embedded portion; the plug body is inserted to the opening, the lock arm is inserted to the accommodating portion and thus locked to the inner surface of the accommodating portion.

In another preferred embodiment, the accommodating portion and the embedded portion have similar shapes, the end portion of the accommodating portion faced to the external side of the first connecting plate is rolled to be a big pipe structure, the end portion of the embedded portion faced to the inner side of the second connecting plate is rolled to be a small pipe structure, the small pipe structure is accommodated to the big pipe structure.

In another preferred embodiment, the accommodating portion is bended towards the external side of the first connecting plate to be a U shape structure with a facing-up opening, the accommodating portion covers the embedded portion.

In another preferred embodiment, the embedded portion is bended towards the inner side of the second connecting plate to be a U shape structure with upwardly opening, the accommodating portion is bended and formed with a first vertical edge, a second vertical edge and a third vertical edge arranged in order, the first vertical edge and the second vertical edge form a U shape groove to cover the embedded portion, the third vertical edge is inserted to the embedded portion.

A ladder, comprising a ladder footstep and a support frame, the footstep is the splicing metal plate, the splicing metal plate comprises at least a pair of elongated first connecting plate and elongated second connecting plate;

the side edge of the first connecting plate is extended downwardly vertically with an accommodating portion with an opening, the side edge of the second connecting plate is extended downwardly vertically with an embedded portion, the embedded portion of the second splicing metal plate is embedded to the accommodating portion of the first splicing plate, the end of the embedded portion is inserted into the accommodating portion from the opening and thus locked to the accommodating portion, further comprising a front end cover and a rear end cover, the front end cover is connected to the front end of the first connecting plate and the second connecting plate along the length direction, the rear end cover is connected to the rear end of the first connecting plate and the second connecting plate along the length direction, the front end cover and the rear end cover are disposed with a support portion at the bottom portion of the first splicing plate and the second splicing plate, the front end cover, the rear end cover, the first connecting plate and the second connecting plate surrounds and defines a groove structure with the bottom portion opening.

In another preferred embodiment, the support frame is pivot joint to the front end cover and the rear end cover respectively.

A table, comprising a table top and table legs, the table legs support the table top, the table top is the splicing metal plate, the splicing metal plate comprises at least a pair of elongated first connecting plate and elongated second connecting plate;

the side edge of the first connecting plate is extended downwardly vertically with an accommodating portion with an opening, the side edge of the second connecting plate is extended downwardly vertically with an embedded portion, the embedded portion of the second splicing metal plate is embedded to the accommodating portion of the first splicing plate, the end of the embedded portion is inserted into the accommodating portion from the opening and thus locked to the accommodating portion, further comprising a front end cover and a rear end cover, the front end cover is connected to the front end of the first connecting plate and the second connecting plate along the length direction, the rear end cover is connected to the rear end of the first connecting plate and the second connecting plate along the length direction, the front end cover and the rear end cover are disposed with a support portion at the bottom portion of the first splicing plate and the second splicing plate, the front end cover, the rear end cover, the first connecting plate and the second connecting plate surrounds and defines a groove structure with the bottom portion opening.

In another preferred embodiment, the periphery of the splicing metal plate is disposed with a metal frame, the table legs are pivot joint to the metal frame respectively.

Compared to the existing known technology, the technical proposal of the present invention has advantages as follows:

1. The accommodating portion and the embedded portion are contacted to each other, the end portion of the embedded portion is inserted to the accommodating portion from the opening and locked to the accommodating portion, so that the first connecting plate is fixedly connected to the second connecting plate. The accommodating portion is locked to the embedded portion to form an integrated body to be placed at the lower portion of the splicing metal plate, the accommodating portion and the embedded portion form a reinforcing rib that significantly improves the strength of the splicing metal plate. The splicing metal plate is composed of a plurality of elongated connecting plates, which efficiently uses former discarded material, thus saving the cost.
2. The embedded portion comprises a plug body, a protruding and a lock arm, the accommodating portion is a hollow pipe structure, the opening is disposed in the side surface of the accommodating portion faced to the embedded portion, by a incline inserting direction of the embedded portion, the lock arm can be inserted to the accommodating portion, so that it is assembled and disassembled with convenience.
3. The end portion of the accommodating portion is rolled to a big pipe structure, the end portion of the embedded portion is rolled to a small pipe structure, so that the embedded portion and the accommodating portion are contacted together and then deformed and connected to each other by rolling mold, the connection is flexible.
4. The external side of the first connecting plate is bended and formed a U shape structure with a facing-up opening, the structure is simple.
5. The embedded portion is a U shape structure with a facing-up opening, the accommodating portion is bended and formed a first vertical edge, a second vertical edge and a third vertical edge disposed in order, the embedded portion and the accommodating portion are bended and connected together, the connection is flexible.

BRIEF DESCRIPTION OF THE DRAWINGS

The present invention will be further described with the drawings and the embodiments.

DETAILED DESCRIPTION OF THE EMBODIMENTS

The First Embodiment

Figure 1:
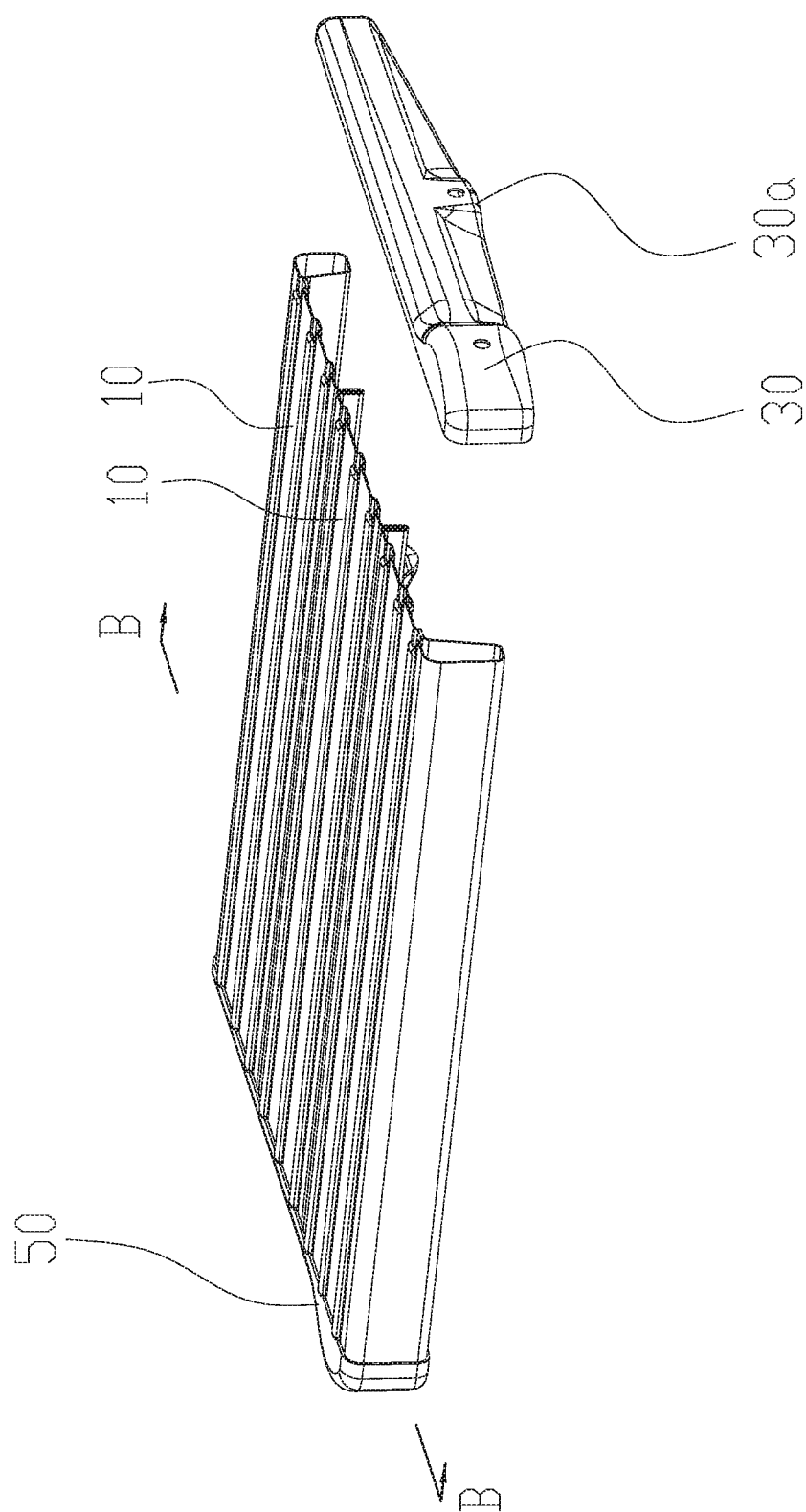
FIG. 1 illustrates a schematic diagram of a first embodiment of a splicing metal plate of the present invention.
Figure 2:
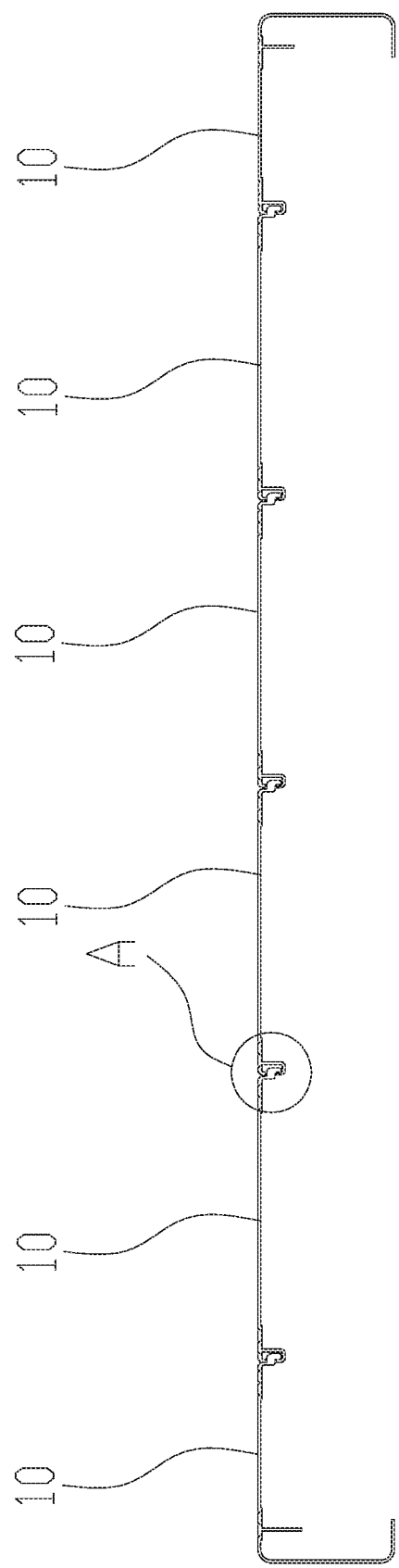
FIG. 2 illustrates a sectional diagram of the splicing metal plate of FIG. 1.
Figure 3:
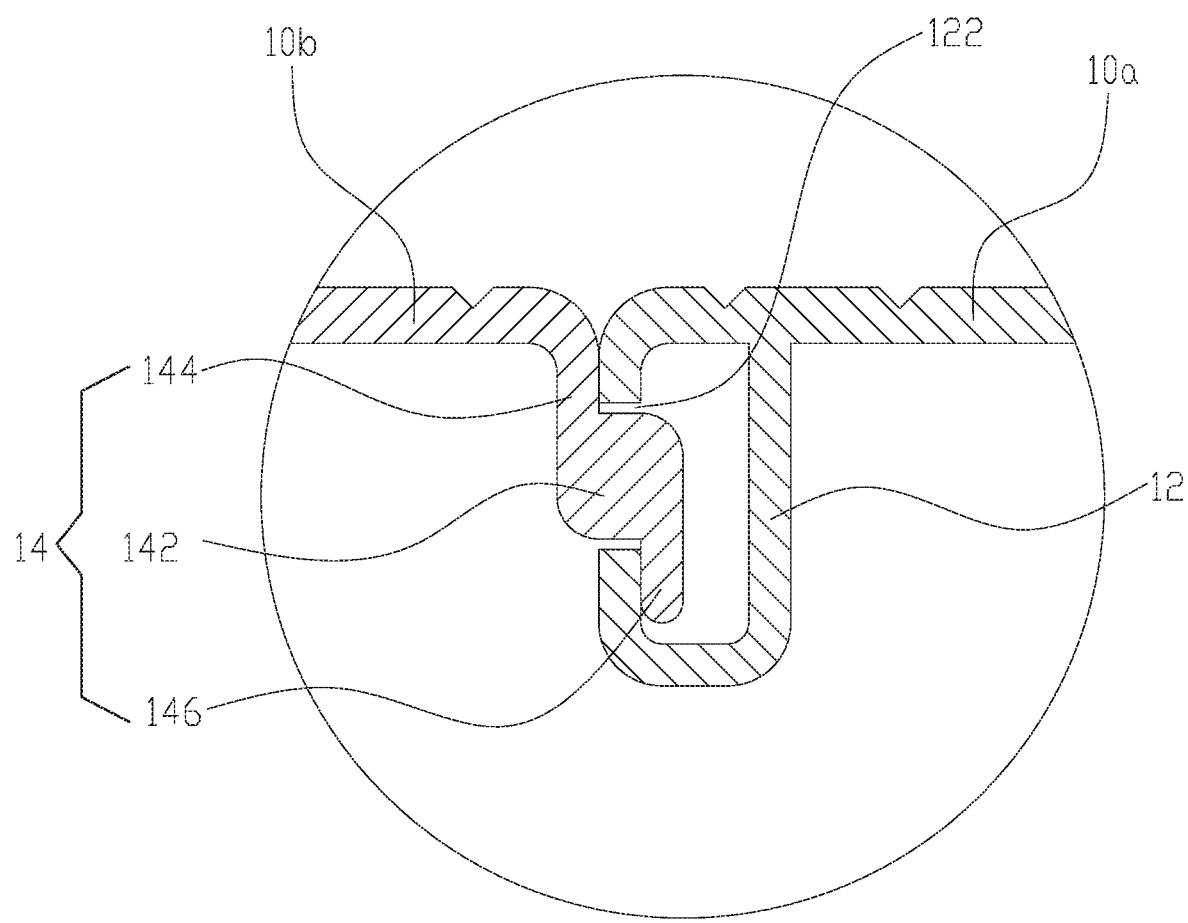
FIG. 3 illustrates an enlargement diagram of A in FIG. 1.

Referring to FIG. 1 and FIG. 2, a splicing metal plate of the present invention comprises a plurality of connecting plates 10 and a front end cover 30 and a rear end cover 50. The connecting plate 10 is elongated shaped. The front end cover 30 is connected to the front end of the connecting plates 10 along the length direction, the rear end cover 50 is connected to the rear end of the connecting plates 10 along the length direction, the front end cover 30, the rear end cover 50 and the connecting plates 10 surrounds and defines a groove structure with the bottom portion opening. Referring to FIG. 2 and FIG. 3, to be convenient for explanation, we may respectively call two adjacent connecting plates 10 the first connecting plate 10a and the second connecting plate 10b. The side edge of the first connecting plate 10a is extended downwardly vertically with an accommodating portion 12 with an opening 122, the side edge of the second connecting plate 10b is extended downwardly vertically with an embedded portion 14, the accommodating portion 12 and the embedded portion 14 are contacted to each other.

The accommodating portion 12 is a hollow pipe structure, the opening 122 is disposed in the side surface of the accommodating portion 12 faced to the embedded portion 14. The embedded portion 14 comprises a plug body 142, a protruding 144 extending vertically upwardly from one side surface of the plug body 142, a lock arm 146 extending vertically downwardly from another side surface of the plug body 142; the thickness of the plug body 142 is corresponding to the height of the opening 122. The end portion of the embedded portion 142 is inserted to the accommodating portion 12 from the opening 122 and locked to the accommodating portion, that is to say, the plug body 142 is inserted to the opening 122, the lock arm 146 is inserted to the accommodating portion 12 and thus locked to the inner surface of the accommodating portion 12. The embedded portion 14 is locked to the accommodating portion 12 to form an integrated body to be placed at the lower portion of the splicing metal plate, the integrated body can be served as a reinforcing rib that significantly improves the bearing capacity of the splicing metal plate.

The Second Embodiment

Figure 4:
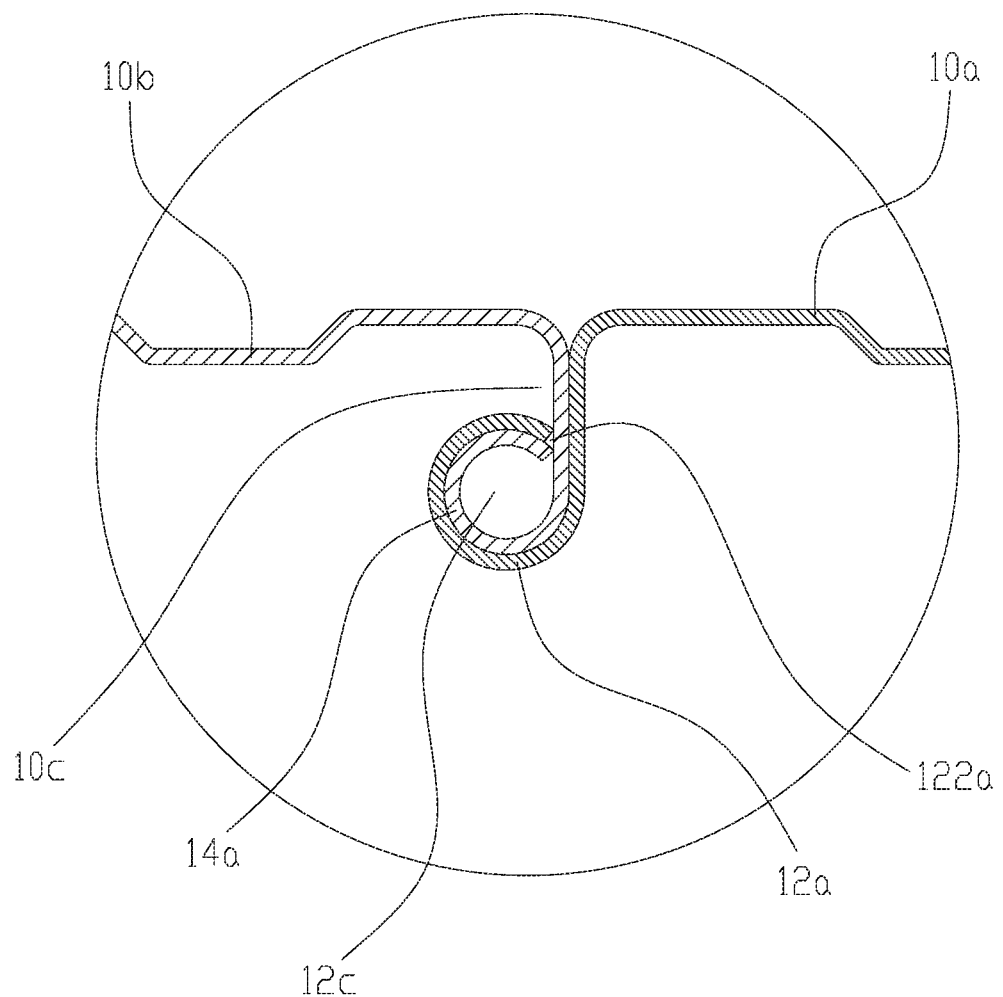
FIG. 4 illustrates a sectional diagram of a second embodiment of a splicing metal plate of the present invention.

Referring to FIG. 4, the splicing metal plate of this embodiment has difference from the first embodiment that: the accommodating portion 12a and the embedded portion 14a have similar shapes, the end portion of the accommodating portion 12a faced to the external side of the first connecting plate 10a is rolled to be a big pipe structure, the end portion of the embedded portion 14a faced to the inner side of the second connecting plate 10b is rolled to be a small pipe structure, the small pipe structure is accommodated to the big pipe structure by the opening 122a.

The Third Embodiment

Figure 5:
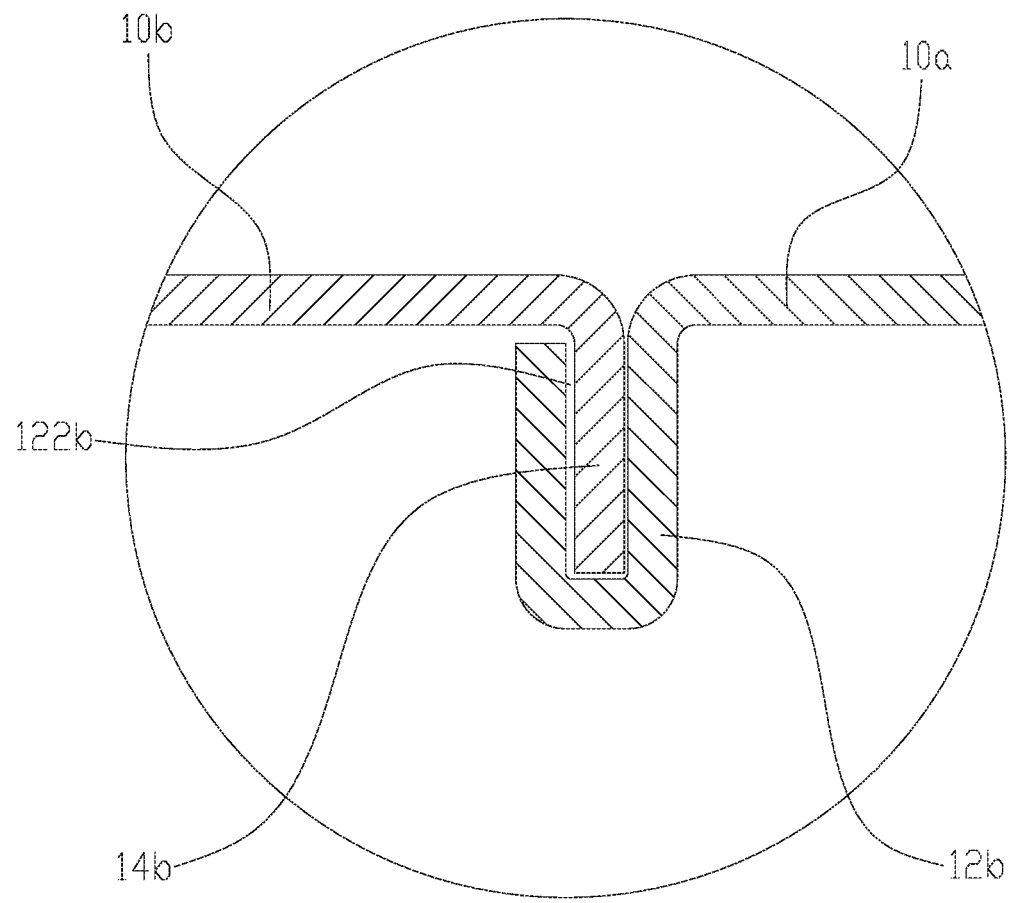
FIG. 5 illustrates a sectional diagram of a third embodiment of a splicing metal plate of the present invention.

Referring to FIG. 5, the splicing metal plate of this embodiment has difference from the first embodiment that: the accommodating portion 12b is bended towards the external side of the first connecting plate 10a to be a U shape structure with a facing-up opening 122b; the embedded portion 14b is a vertical plate structure, the accommodating portion 12b covers the embedded portion 14b.

The Forth Embodiment

Figure 6:
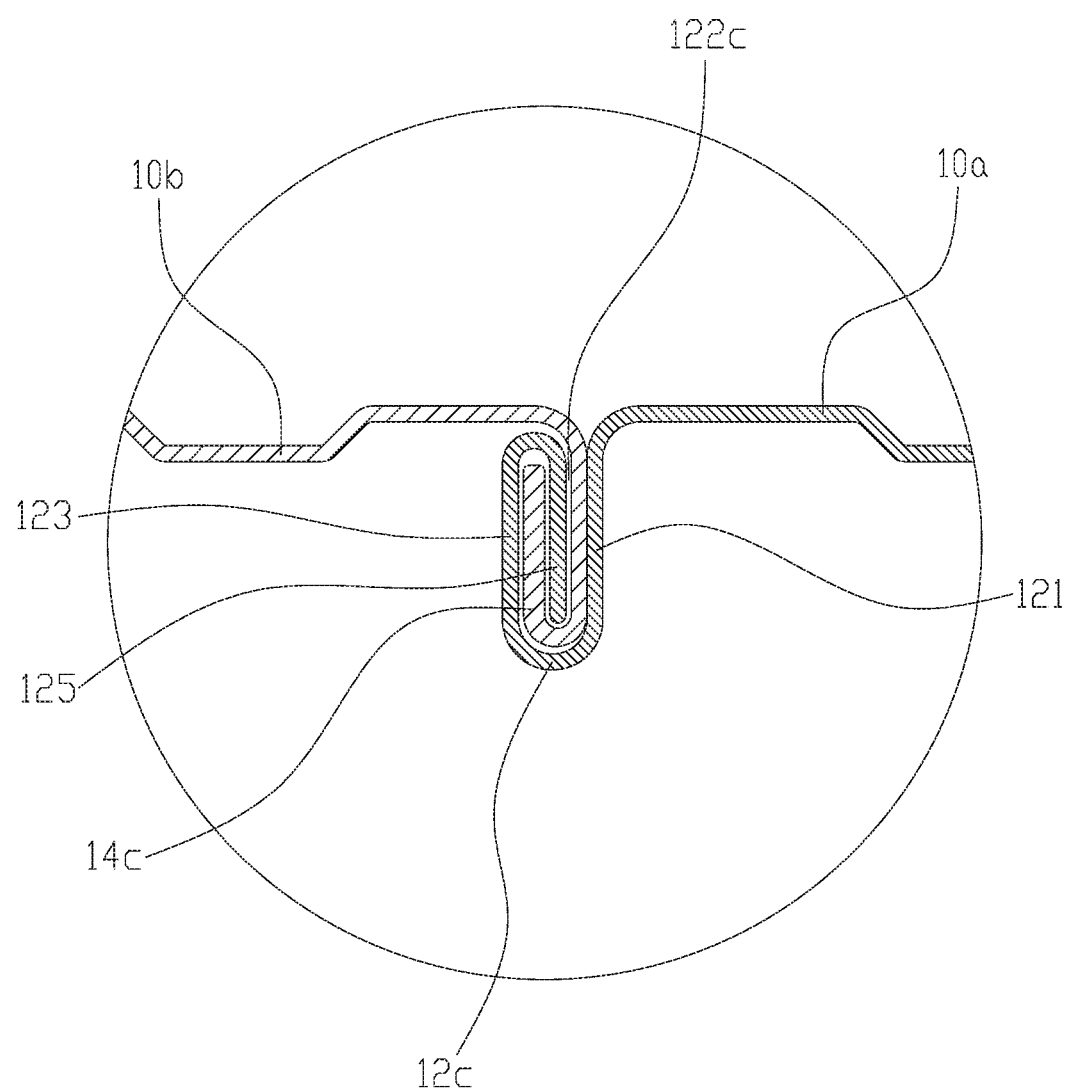
FIG. 6 illustrates a sectional diagram of a fourth embodiment of a splicing metal plate of the present invention.

Referring to FIG. 6, the splicing metal plate of this embodiment has difference from the first embodiment that: the embedded portion 14c is bended towards the inner side of the second connecting plate 10b to be a U shape structure with a facing-up opening, the accommodating portion 12c is bended and formed with a first vertical edge 121, a second vertical edge 123 and a third vertical edge 125 arranged in order, the first vertical edge 121 and the second vertical edge 123 form a U shape groove to cover the embedded portion 14c, the third vertical edge 125 is inserted to the embedded portion 14c.

Figure 7:
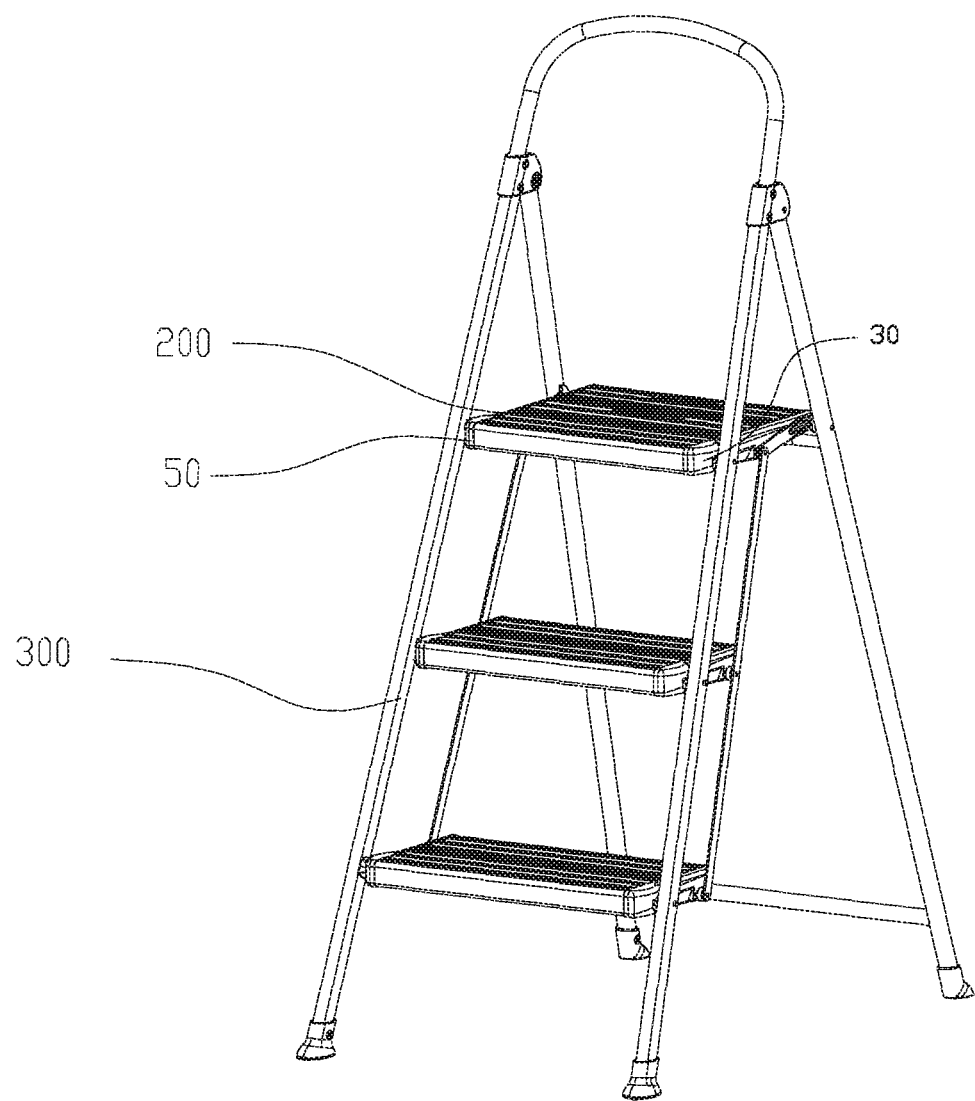
FIG. 7 illustrates a schematic diagram of a folding ladder applied with the splicing metal plate of the present invention.

Please referring to FIG. 7, the splicing metal plate of the present invention can be applied in a footstep 200 of a ladder, the ladder comprises a footstep 200 and a support frame 300, the footstep 200 is the splicing metal plate, the support frame 300 is pivot joint to the front end cover 30 and the rear end cover 50 respectively, it can not only improve the bearing capacity of the ladder, but also efficiently use the discarded materials, thus saving the cost.

Figure 8:
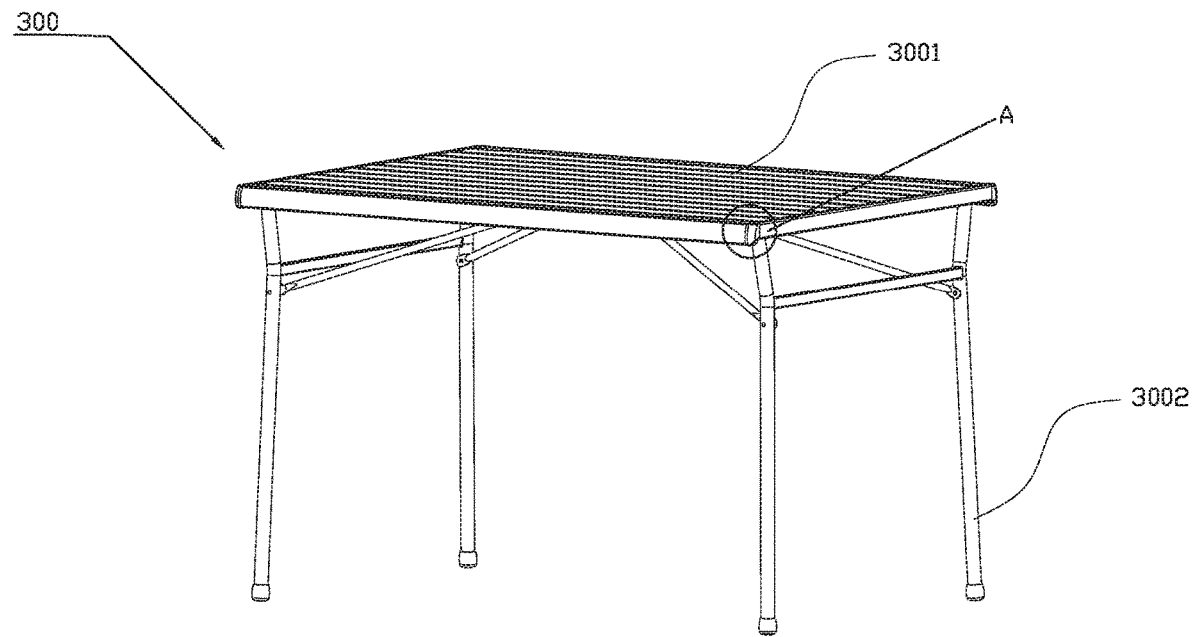
FIG. 8 illustrates a schematic diagram of a table applied with the splicing metal plate of the present invention.
Figure 9:
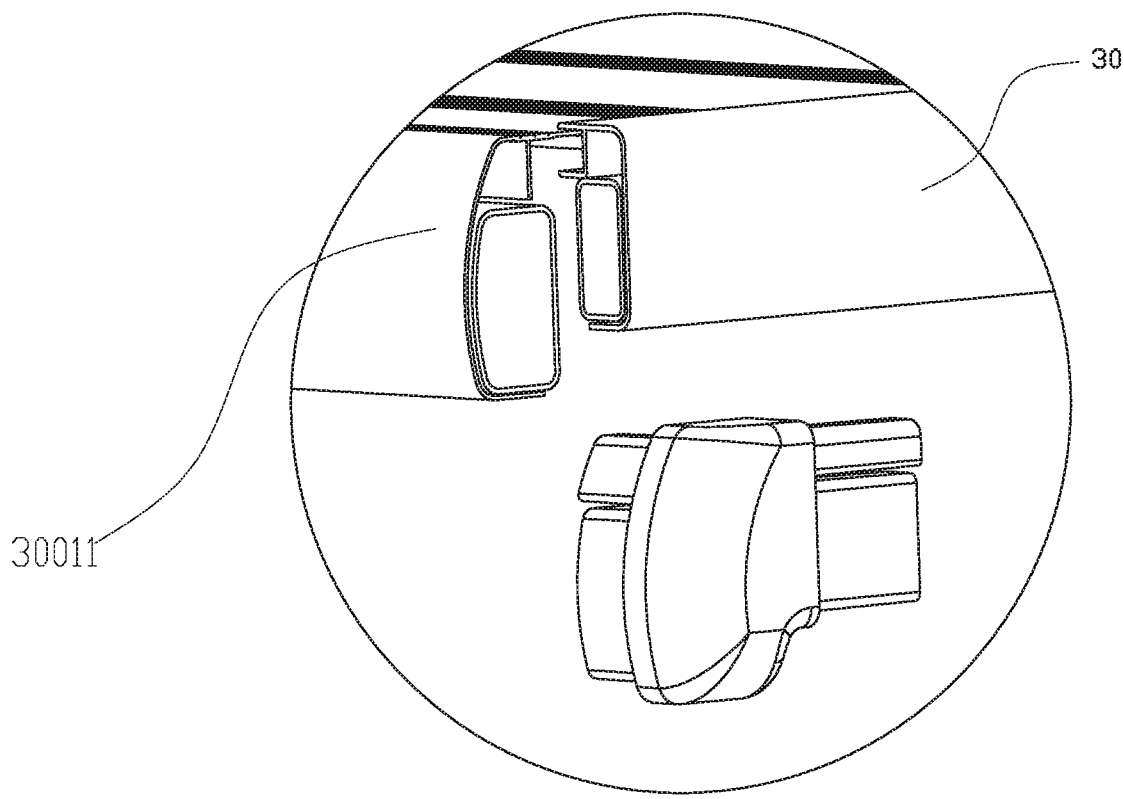
FIG. 9 illustrates an enlargement diagram of A of FIG. 8.
Figure 10:
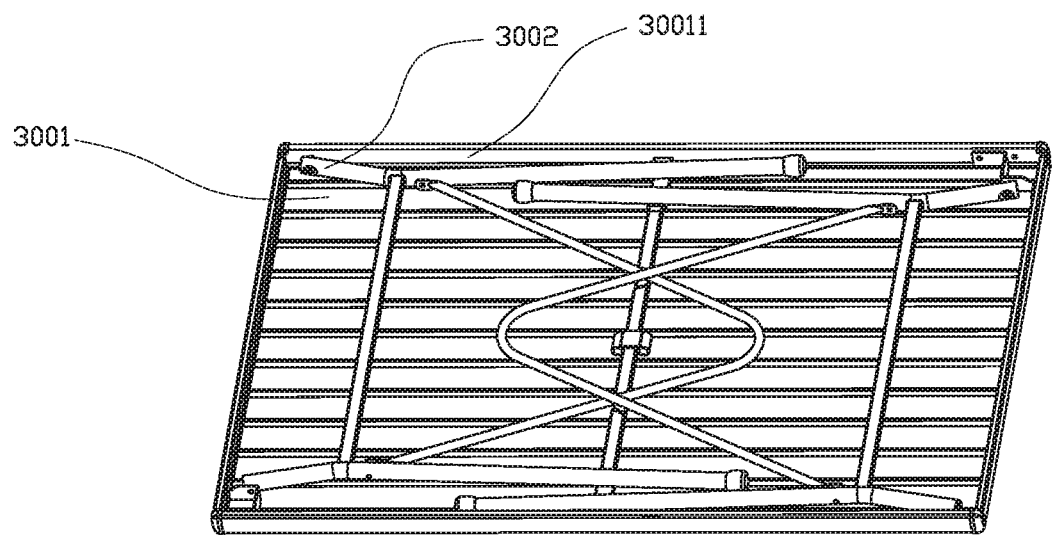
FIG. 10 illustrates a schematic diagram of a table bottom applied with the splicing metal plate of the present invention.

Please referring to FIG. 8, FIG. 9 and FIG. 10, the splicing metal plate of the present invention can be applied in a table top 3001 of a table 300, the table comprises a table top 3001 and table legs 3002, the table legs 3002 support the table top 3001, the table top 3001 is the splicing metal plate, the periphery of the splicing metal plate is disposed with a metal frame 30011, the table legs 3002 are pivot joint to the metal frame 30011 respectively. It can not only improve the bearing capacity of the table, but also efficiently use the discarded materials, thus saving the cost.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided that the accommodating portion of the first splicing plate is locked to the embedded portion of the second splicing plate, and forming an once-forming structure, the accommodating portion and the embedded portion form a reinforcing rib of the splicing metal plate that significantly improves the strength of the splicing metal plate.

The invention claimed is:

1. A spliced metal plate, comprising:
    at least two elongated plates, wherein:
        a first one of the at least two elongated plates comprises a first upper surface and a first connecting end that extends vertically downward away from the first upper surface and defines with an accommodating portion having an opening,
        a second one of the at least two elongated plates, adjacent the first one of the at least two elongated plates, comprises a second upper surface and a second connecting end that extends vertically downward away from the second upper surface and defines an embedded portion, and
        the accommodating portion accommodates the embedded portion;
    a front-end cover that is connected to front-ends of the at least two elongated plates;
    a rear-end cover that is connected to rear-ends of the at least two elongated plates; and
    a supporting portion for the front-end cover and for the rear-end cover disposed at a bottom portion of the at least two elongated plates,
    wherein the first connecting end defining the accommodating portion and the second connecting end defining the embedded portion are wholly below the first upper surface and the second upper surface, wherein both the embedded portion and the accommodating portion curl upwards to form curls and toward both a side surface of the first connecting end and a side surface of the second connecting end, wherein the curl of the embedded portion terminates and contacts the side surface of the second connecting end, and the curl of the accommodating portion terminates and contacts the side surface of the second connecting end.

2. The spliced metal plate according to claim 1, wherein:
    the accommodating portion and the embedded portion have similar shapes,
    an end portion of the accommodating portion faced to an external side of the first one of the at least two elongated plates forms a big pipe structure having a circular cross-section, and
    an end portion of the embedded portion faced to an inner side of the second one of the at least two elongated plates forms a small pipe structure having a circular cross-section and a size that is accommodated within the big pipe structure.

3. A ladder, comprising:
    a footstep that comprises the spliced metal plate according to claim 1; and
    a support.

4. The ladder according to claim 3, wherein the support is pivotally joined to the front-end cover and to the rear-end cover, respectively.

5. A table, comprising:
    a table top that comprises the spliced metal plate according to claim 1; and
    table legs that are connected to the table top to support the table top.

6. The table according to claim 5, wherein:
    the spliced metal plate has a periphery that is disposed with a metal frame, and
    the table legs are pivotally joined, respectively, to the metal frame.

7. The spliced metal plate of claim 1, wherein the curl of the accommodating portion entirely covers an outer surface of the curl of the embedded portion.

8. The spliced metal plate of claim 1, wherein:
    the first connecting end and the second connecting end jointly extend vertically downward to form a parallel arrangement, and
    the parallel arrangement rolls upward to form a curl structure.

9. The spliced metal plate of claim 1, wherein the first upper surface is co-planar with the second upper surface.

10. The spliced metal plate of claim 1, wherein a sidewall of the second connecting end is disposed between a sidewall of the first connecting end and an end surface of the first connecting end.

11. The spliced metal plate of claim 10, wherein the end surface of the first connecting end is parallel with an end surface of the second connecting end.

12. The spliced metal plate of claim 1, wherein the first one of the at least two elongated plates comprises a first recessed portion having a third upper surface vertically spaced closer to an end surface of the first connecting end than the first upper surface.

13. The spliced metal plate of claim 12, wherein the second one of the at least two elongated plates comprises a second recessed portion having a fourth top surface vertically spaced closer to an end surface of the second connecting end than the second upper surface.

14. The spliced metal plate of claim 12, wherein the first upper surface is disposed between the first recessed portion and the first connecting end.

15. The spliced metal plate of claim 13, wherein the first upper surface is an uppermost surface of the first one of the at least two elongated plates and the second upper surface is an uppermost surface of the second one of the at least two elongated plates.

* * * * *